(12) United States Patent
Schoenek et al.

(10) Patent No.: US 8,795,114 B2
(45) Date of Patent: Aug. 5, 2014

(54) HYBRID POWERTRAIN

(75) Inventors: Norman Schoenek, Novi, MI (US);
Elizabeth I. Wooden, Farmington Hills, MI (US); Min-Joong Kim, Bloomfield Hills, MI (US); Shawn H. Swales, Canton, MI (US); Xiaohui Du, West Bloomfield, MI (US); Leonid Basin, Farmington Hills, MI (US); John Czubay, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 13/354,447

(22) Filed: Jan. 20, 2012

(65) Prior Publication Data

US 2013/0190122 A1 Jul. 25, 2013

(51) Int. Cl.
*B60K 6/365* (2007.10)
*F16H 1/46* (2006.01)

(52) U.S. Cl.
USPC ............... 475/5; 475/219; 475/275; 475/302

(58) Field of Classification Search
USPC ................................. 475/219, 302
See application file for complete search history.

(56) References Cited

U.S. PATENT DOCUMENTS

| 5,129,870 | A * | 7/1992 | Pierce | 475/285 |
| 5,730,676 | A * | 3/1998 | Schmidt | 475/5 |
| 6,491,599 | B1 * | 12/2002 | Schmidt | 475/5 |
| 7,632,201 | B2 * | 12/2009 | Takami et al. | 475/5 |
| 8,357,073 | B2 * | 1/2013 | Iwase et al. | 477/3 |
| 2003/0199360 | A1 * | 10/2003 | Biallas | 475/290 |
| 2009/0176610 | A1 * | 7/2009 | Conlon | 475/5 |
| 2009/0229393 | A1 * | 9/2009 | Shibata et al. | 74/335 |

\* cited by examiner

*Primary Examiner* — David D Le
*Assistant Examiner* — Mark Manley
(74) *Attorney, Agent, or Firm* — Quinn Law Group, PLLC (57) ABSTRACT

A transmission includes a first motor/generator having a first rotor that is selectively rotatable about a first axis and a second motor/generator having a second rotor that is selectively rotatable about a second axis. A first planetary gearset and a second planetary gearset each has a respective first planetary member, a respective second planetary member, and a respective third planetary member. One of the members of the first planetary gearset is operatively connected to the first rotor to receive torque therefrom. One of the members of the second planetary gearset is operatively connected to the second rotor to receive torque therefrom.

14 Claims, 8 Drawing Sheets

HYBRID POWERTRAIN

TECHNICAL FIELD

This invention relates to hybrid vehicle powertrains.

BACKGROUND

Electrically variable vehicle transmissions (EVTs) typically employ two electric motor/generators. The electric motor/generators are coaxially oriented with an input shaft connectable to an engine, an output shaft, and a plurality of planetary gearsets each having respective first, second, and third members. Each motor/generator is operatively connected to a respective member of one of the planetary gearsets to provide a range or mode of transmission operation characterized by a continuously variable speed ratio between the input shaft and the output shaft. The continuously variable speed ratio is proportional to the speed of one of the motor/generators. The motor/generators are operatively connected to an energy storage device, such as a battery, to transmit energy thereto when operating as a generator, and to receive energy therefrom when acting as a motor.

SUMMARY

According to a first aspect of the disclosure, a transmission includes an input member, an output member, a stationary member, a first motor/generator having a first rotor that is selectively rotatable about a first axis, and a second motor/generator having a second rotor that is selectively rotatable about a second axis. A first planetary gearset and a second planetary gearset each has a respective first planetary member, a respective second planetary member, and a respective third planetary member.

The first planetary member of the first planetary gearset is operatively connected to the input member to receive torque therefrom. The second planetary member of the first planetary gearset is operatively connected to the first rotor to receive torque therefrom. The third planetary member of the first planetary gearset is operatively connected to the output member to transmit torque thereto.

The second planetary member of the second planetary gearset is operatively connected to the second rotor to receive torque therefrom. The third planetary member of the second planetary gearset is operatively connected to the output member to transmit torque thereto. A first torque transmitting device is selectively engageable to couple the first planetary member of the second planetary gearset to the stationary member.

According to a second aspect of the disclosure, a transmission includes an output member, a first planetary gearset and a second planetary gearset each having a respective first planetary member, a respective second planetary member, and a respective third planetary member, and a final drive system having a first gear member, a second gear member, a third gear member, and a fourth gear member.

The first gear member is operatively connected to the third planetary member of the second planetary gearset for unitary rotation therewith. The second gear member is meshingly engaged with the first and third gear members. The third gear member is operatively connected to the third planetary member of the first planetary gearset for unitary rotation therewith. The fourth gear member is operatively connected to the output member for unitary rotation therewith and is meshingly engaged with the third gear member.

The above features and advantages and other features and advantages of the present invention are readily apparent from the following detailed description of the best modes for carrying out the invention when taken in connection with the accompanying drawings.

DETAILED DESCRIPTION

Figure 1:
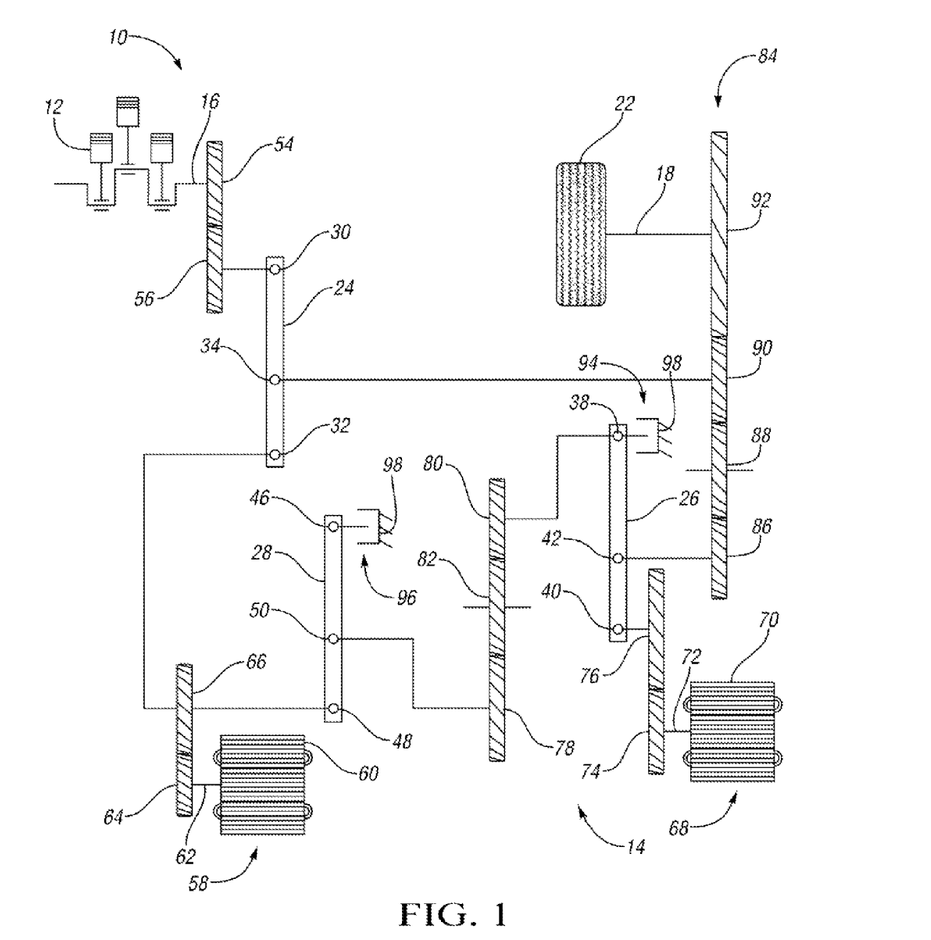
FIG. 1 is a schematic lever diagram depicting a first transmission.

Referring to FIG. 1, a vehicle powertrain 10 is schematically depicted. The powertrain 10 includes an engine 12 and a transmission 14. The transmission 14 includes an input member 16 and an output member 18. The input member 16 is operatively connected to the crankshaft of the engine 12 through a powertrain damper/isolator (not shown) to receive torque therefrom. The output member 18 is operatively connected to the vehicle's drive wheels 22 to transmit torque thereto via a differential assembly (not shown). The transmission 14 also includes first, second and third planetary gearsets 24, 26, 28.

Figure 2:
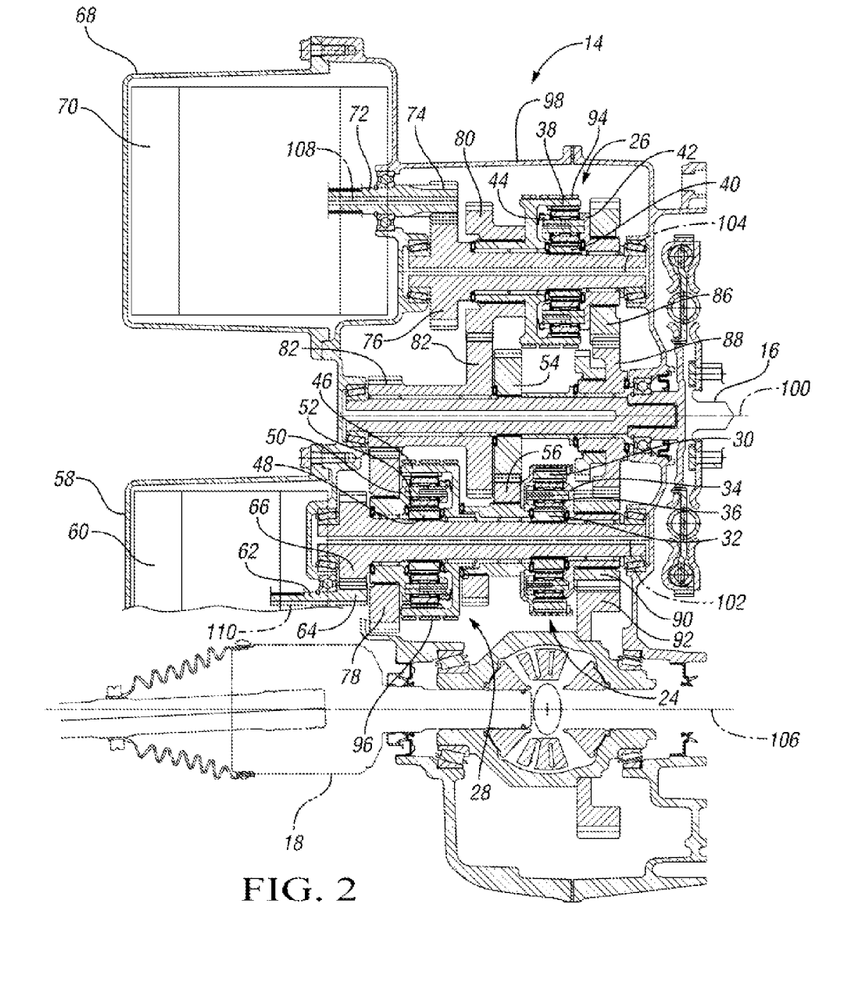
FIG. 2 is a schematic, sectional, side view of the transmission of FIG. 1.

Referring to FIGS. 1 and 2, each of the planetary gearsets 24, 26, 28 includes respective first, second, and third planetary members. In the first planetary gearset 24, the first planetary member is a ring gear member 30, the second planetary member is a sun gear member 32, and the third planetary member is a planet carrier member 34. The first planetary gearset includes at least one pinion gear 36 that is rotatably connected to the planet carrier member 34, and that is meshingly engaged with both the ring gear member 30 and the sun gear member 32.

In the second planetary gearset 26, the first planetary member is a ring gear member 38, the second planetary member is a sun gear member 40, and the third planetary member is a planet carrier member 42. The second planetary gearset includes at least one pinion gear 44 that is rotatably connected to the planet carrier member 42, and that is meshingly engaged with both the ring gear member 38 and the sun gear member 40.

In the third planetary gearset 28, the first planetary member is a ring gear member 46, the second planetary member is a sun gear member 48, and the third planetary member is a planet carrier member 50. The second planetary gearset includes at least one pinion gear 52 that is rotatably connected to the planet carrier member 50, and that is meshingly engaged with both the ring gear member 46 and the sun gear member 48. It should be noted that, where used in the claims, first, second, and third members of planetary gearsets do not necessarily refer to a member of a particular type; thus, for example, a first member may be any one of a ring gear member, sun gear member, or planet carrier assembly. Similarly, as used in the claims, the respective first, second, or third members of two or more gearsets may or may not be the same type of member.

The input member 16 is operatively connected to ring gear member 30 via a plurality of engine transfer gear members 54, 56. More specifically, the input member 16 is operatively connected to a first engine transfer gear member 54 for unitary rotation therewith. Ring gear member 30 is operatively connected to a second engine transfer gear member 56 for unitary rotation therewith. Gear member 54 and gear member 56 are meshingly engaged with one another. Gear members 54, 56 allow for optimizing engine to drivetrain matching. Accordingly, the ring gear member 30 is operatively connected to the input member 16 to receive torque therefrom via the gear members 54, 56.

A first motor/generator 58 includes a stator 60 and a first rotor 62. The sun gear 32 is operatively connected to the first rotor 62 to receive torque therefrom. More specifically, the first rotor 62 is operatively connected to sun gear member 32 via a motor torque transfer mechanism having a plurality of meshing motor torque transfer gear members 64, 66. The rotor 62 is operatively connected to a first motor torque transfer gear member 64 for unitary rotation therewith. Sun gear member 32 is operatively connected to a second motor torque transfer gear member 66 for unitary rotation therewith. Gear member 64 and gear member 66 are meshingly engaged with one another. Sun gear member 48 is also operatively connected to gear member 66 for unitary rotation therewith. Accordingly, sun gear member 32, sun gear member 48, and gear member 66 rotate at the same speed, and sun gear member 48 is operatively connected to the first rotor 62 to receive torque therefrom. The stator 60 is connected to a stationary member, such as the transmission housing 98.

A second motor/generator 68 includes a stator 70 and a second rotor 72. The sun gear member 40 is operatively connected to the second rotor 72 to receive torque therefrom. More specifically, the second rotor 72 is operatively connected to sun gear member 40 via a motor torque transfer mechanism having a plurality of meshing motor torque transfer gear members 74, 76. More specifically, the second rotor 72 is operatively connected to a first motor torque transfer gear member 74 for unitary rotation therewith. Sun gear member 40 is operatively connected to a second motor torque transfer gear member 76 for unitary rotation therewith. Gear member 74 and gear member 76 are meshingly engaged with one another. The stator 70 is connected to a stationary member, such as the transmission housing 98.

Planet carrier member 50 is operatively connected to ring gear member 38 to transmit torque thereto via an axis transfer mechanism having a first axis transfer gear member 78, a second axis transfer gear member 82, and a third axis transfer gear member 80. More specifically, the first axis transfer gear member 78 is operatively connected to the planet carrier member 50 for unitary rotation therewith. The second axis transfer gear member 82 is meshingly engaged with the first and third axis transfer gear members 78, 80. The third axis transfer gear member 80 is operatively connected to ring gear member 38 for unitary rotation therewith. Gear member 82 is an idler gear in the embodiment depicted.

Planet carrier 34 is operatively connected to the output member 18 to transmit torque thereto via a dual transfer final drive system 84. Planet carrier 42 is also operatively connected to the output member 18 to transmit torque thereto via the dual transfer final drive system 84. The dual transfer final drive system 84 includes a first gear member 86, a second gear member 88, a third gear member 90, and a fourth gear member 92. The first gear member 86 is operatively connected to planet carrier member 42 for unitary rotation therewith. The second gear member 88 is meshingly engaged with the first and third gear members 86, 90. The third gear member 90 is operatively connected to planet carrier member 34 for unitary rotation therewith. The fourth gear member 92 is operatively connected to the output member 18 for unitary rotation therewith and is meshingly engaged with the third gear member 90.

The transmission includes a first torque transmitting mechanism, namely, a first brake 94, which is configured to selectively couple ring gear member 38 to a stationary member, such as the transmission housing 98 to prevent the rotation of the ring gear member 38. The transmission includes a second torque transmitting mechanism, namely, a second brake 96, which is configured to selectively couple ring gear member 46 to a stationary member, such as the transmission housing 98 to prevent the rotation of the ring gear member 46.

Referring specifically to FIG. 2, the input member 16 and gear members 54, 82, 88 are coaxially disposed, and selectively rotatable, about axis 100. Ring gear member 30, sun gear member 32, planet carrier member 34, ring gear member 46, sun gear member 48, planet carrier member 50, and gear members 56, 66, 78, and 90 are coaxially disposed, and selectively rotatable, about axis 102. Ring gear member 38, sun gear member 40, planet carrier member 42, and gear members 76, 80, 86 are coaxially disposed, and selectively rotatable, about axis 104. Gear member 92 and output member 18 are coaxially disposed, and selectively rotatable about, axis 106. Rotor 62 and gear member 64 are coaxially disposed, and selectively rotatable, about axis 110. Rotor 72 and gear member 74 are coaxially disposed, and selectively rotatable, about axis 108.

Accordingly, the first rotor 62 is selectively rotatable about a first axis 110, and the second rotor 72 is selectively rotatable about a second axis 108. The first, second, and third planetary members 30, 32, 34 of the first planetary gearset 24 are selectively rotatable about a third axis 102. The first, second, and third planetary members 46, 48, 50 of the third planetary gearset 28 are also selectively rotatable about the third axis 102. The first, second, and third planetary members 38, 40, 42 of the second planetary gearset 26 are selectively rotatable about a fourth axis 104.

Figure 3:
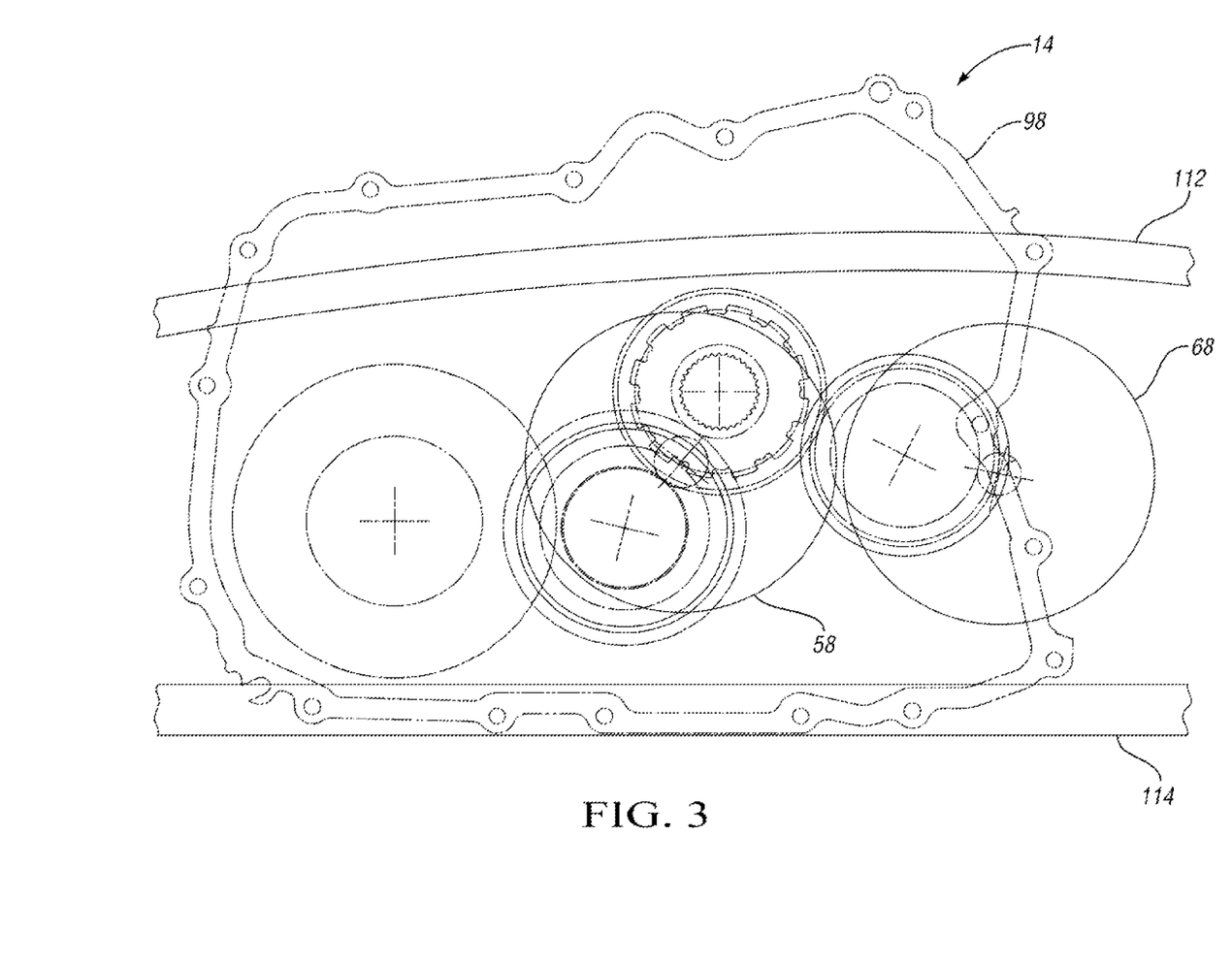
FIG. 3 is a schematic, side view of the transmission of FIGS. 1 and 2 disposed relative to a vehicle frame rail and an engine cradle.

Accordingly, the motor/generators 58, 68 are not coaxially aligned with other components of the transmission 14, such as planetary gearsets 24, 26, 28, the input member 16, and the output member 18. By orienting the motor/generators 58, 68 along different axes, the transmission 14 facilitates efficient packaging of the transmission and other components within a vehicle body. Referring to FIG. 3, wherein like reference numbers refer to like components from FIGS. 1 and 2, the transmission 14 is configured such that the motor/generators 58, 68 are packaged in unused space between an upper rail 112 of a vehicle body and the engine cradle 114, in a location forward of the front wheel well (not shown). Furthermore, by arranging the motor/generators 58, 68 along separate axes, the motor/generators may be made more compact and inexpensive, which simplifies transmission assembly and requires fewer internal supports.

Referring again to FIGS. 1 and 2, a reverse mode for the transmission 14 is achieved when brake 94 is engaged, brake 96 is disengaged, and rotors 62, 72 both rotate in a first direction. A first forward electrically variable mode (underdrive) is achieved when brake 94 is engaged, brake 96 is disengaged, rotor 62 rotates in the first direction, and rotor 72 rotates in a second direction opposite the first direction. The first forward electrically variable mode (overdrive) is achieved when brake 94 is engaged, brake 96 is disengaged, and both rotors 62, 72 rotate in the second direction. A second forward electrically variable mode is achieved when brake 94 is disengaged, brake 96 is engaged, and rotors 62, 72 both rotate in the second direction. A fixed-ratio mode is achieved when both brakes 94, 96 are engaged and rotor 72 rotates in the second direction. An electric-only mode is achieved when brake 94 is engaged, brake 96 is disengaged, the engine 12 is off, and the rotors 62, 72 are rotating in the second direction.

Figure 4:
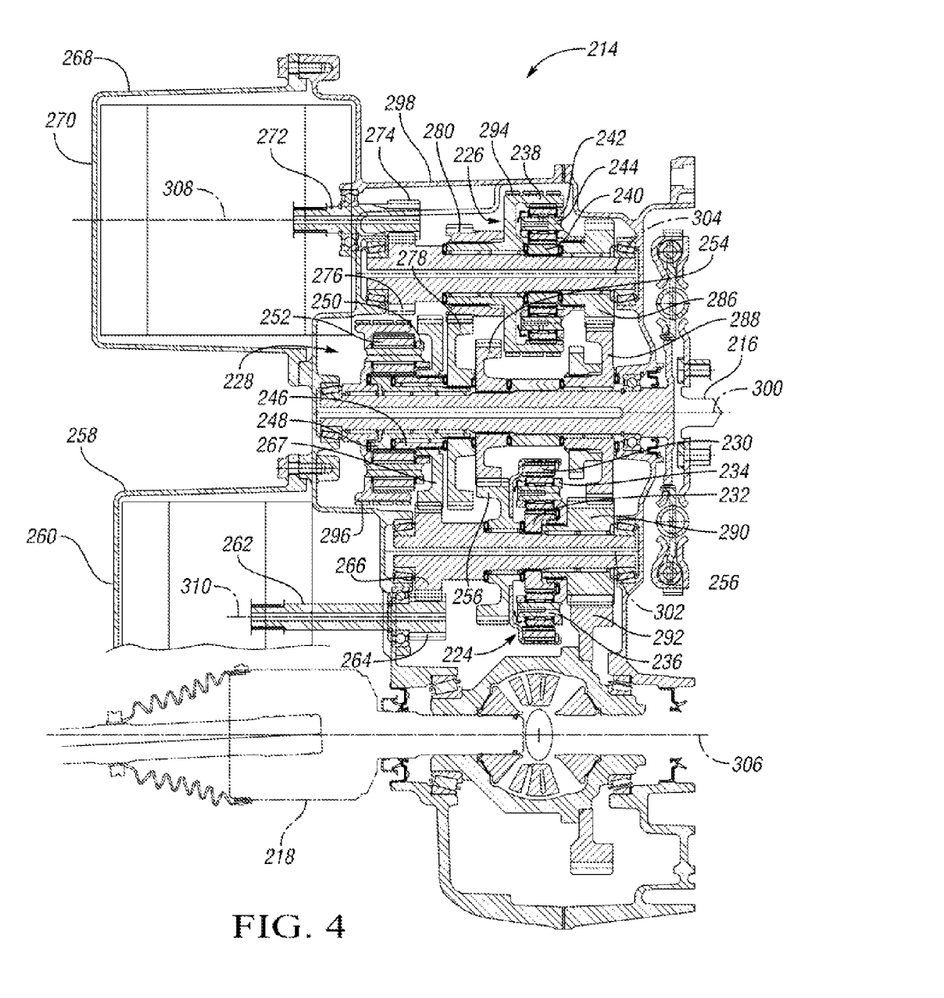
FIG. 4 is a schematic, sectional, side view of a second transmission in accordance with the claimed invention.
Figure 5:
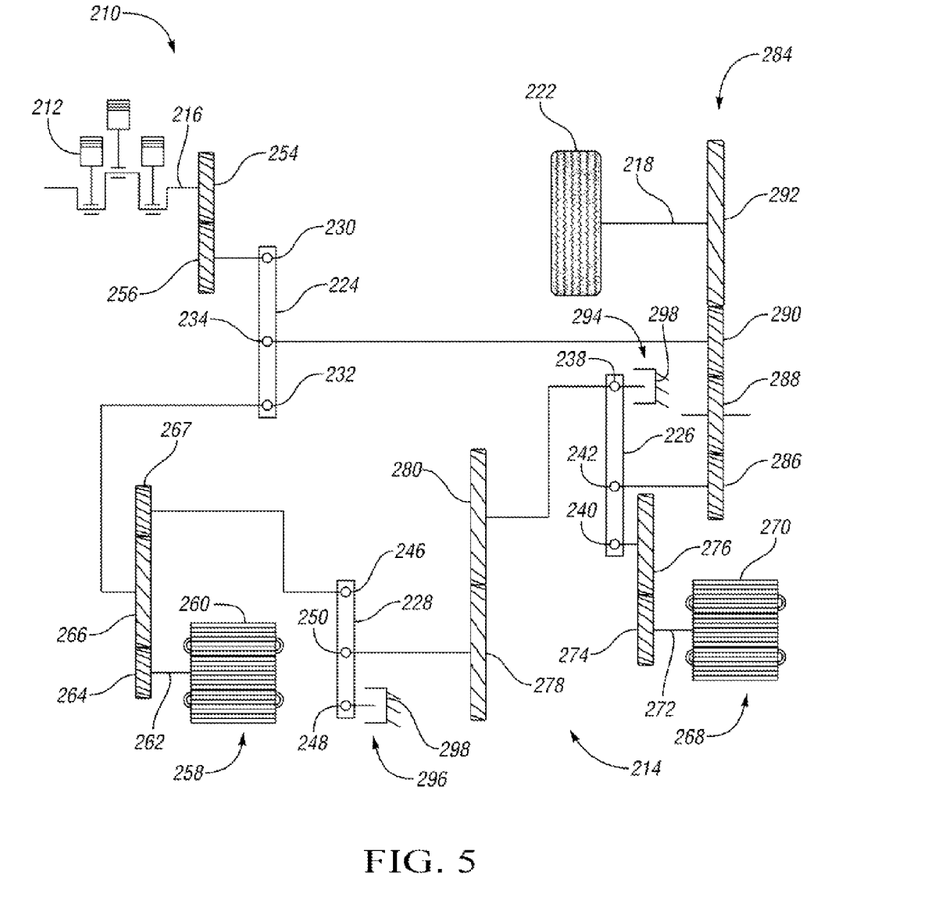
FIG. 5 is a schematic lever diagram depicting the transmission of FIG. 4.

Referring to FIGS. 4 and 5, a vehicle powertrain 210 is schematically depicted. The powertrain 210 includes an engine 212 and a transmission 214. The transmission 214 includes an input member 216 and an output member 218. The input member 216 is operatively connected to the crankshaft of the engine 212 to receive torque therefrom. The output member 218 is operatively connected to the vehicle's drive wheels 222 to transmit torque thereto. The transmission 214 also includes first, second and third planetary gearsets 224, 226, 228.

Each of the planetary gearsets 224, 226, 228 includes respective first, second, and third planetary members. In the first planetary gearset 224, the first planetary member is a ring gear member 230, the second planetary member is a sun gear member 232, and the third planetary member is a planet carrier member 234. The first planetary gearset includes at least one pinion gear 236 that is rotatably connected to the planet carrier member 234, and that is meshingly engaged with both the ring gear member 230 and the sun gear member 232.

In the second planetary gearset 226, the first planetary member is a ring gear member 238, the second planetary member is a sun gear member 240, and the third planetary member is a planet carrier member 242. The second planetary gearset includes at least one pinion gear 244 that is rotatably connected to the planet carrier member 242, and that is meshingly engaged with both the ring gear member 38 and the sun gear member 240.

In the third planetary gearset 228, the first planetary member is a sun gear member 248, the second planetary member is a sun gear member 246, and the third planetary member is a planet carrier member 250. The second planetary gearset includes at least one pinion gear 252 that is rotatably connected to the planet carrier member 250, and that is meshingly engaged with both the sun gear members 246, 248.

The input member 216 is operatively connected to ring gear member 230 via a plurality of meshing engine transfer gear members 254, 256. More specifically, the input member 216 is operatively connected to a first engine transfer gear member 254 for unitary rotation therewith. Ring gear member 230 is operatively connected to a second engine transfer gear member 256 for unitary rotation therewith. Gear member 254 and gear member 256 are meshingly engaged with one another. Gear members 254, 256 allow for optimizing engine to drivetrain matching. Accordingly, the ring gear member 230 is operatively connected to the input member 216 to receive torque therefrom via the gear members 254, 256.

A first motor/generator 258 includes a stator 260 and a first rotor 262. The sun gear 232 is operatively connected to the first rotor 262 to receive torque therefrom. More specifically, the first rotor 262 is operatively connected to sun gear member 232 via a motor torque transfer mechanism having a plurality of meshing motor torque transfer gear members 264, 266, 267. The rotor 262 is operatively connected to a first motor torque transfer gear member 264 for unitary rotation therewith. Sun gear member 232 is operatively connected to a second motor torque transfer gear member 266 for unitary rotation therewith. Gear member 264 and gear member 266 are meshingly engaged with one another. Sun gear member 246 is operatively connected to a third motor torque transfer gear member 267 for unitary rotation therewith. Gear member 267 is meshingly engaged with gear member 266. Accordingly, sun gear member 246 is operatively connected to the first rotor 262 to receive torque therefrom.

A second motor/generator 268 includes a stator 270 and a second rotor 272. The sun gear member 240 is operatively connected to the second rotor 272 to receive torque therefrom. More specifically, the second rotor 272 is operatively connected to sun gear member 240 via a motor torque transfer mechanism having a plurality of meshing motor torque transfer gear members 274, 276. More specifically, the second rotor 272 is operatively connected to a first motor torque transfer gear member 274 for unitary rotation therewith. Sun gear member 240 is operatively connected to a second motor torque transfer gear member 276 for unitary rotation therewith. Gear member 274 and gear member 276 are meshingly engaged with one another.

Planet carrier member 250 is operatively connected to ring gear member 238 to transmit torque thereto via an axis transfer mechanism having a first axis transfer gear member 278 and a second axis transfer gear member 280. More specifically, the first axis transfer gear member 278 is operatively connected to the planet carrier member 250 for unitary rotation therewith. The second axis transfer gear member 280 is meshingly engaged with the first axis transfer gear member 278, and is operatively connected to ring gear member 238 for unitary rotation therewith.

Planet carrier 234 is operatively connected to the output member 218 to transmit torque thereto via a dual transfer final drive system 284. Planet carrier 242 is also operatively connected to the output member 18 to transmit torque thereto via the dual transfer final drive system 284. The dual transfer final drive system 284 includes a first gear member 286, a second gear member 288, a third gear member 290, and a fourth gear member 292. The first gear member 286 is operatively connected to planet carrier member 242 for unitary rotation therewith. The second gear member 288 is meshingly engaged with the first and third gear members 286, 290. The third gear member 290 is operatively connected to planet carrier member 234 for unitary rotation therewith. The fourth gear member 292 is operatively connected to the output member 218 for unitary rotation therewith and is meshingly engaged with the third gear member 290.

The transmission includes a first torque transmitting mechanism, namely, a first brake 294, which is configured to selectively couple ring gear member 238 to a stationary member, such as the transmission housing 298 to prevent the rotation of the ring gear member 238. The transmission includes a second torque transmitting mechanism, namely, a second brake 296, which is configured to selectively couple sun gear member 248 to a stationary member, such as the transmission housing 298 to prevent the rotation of the sun gear member 248.

Referring specifically to FIG. 4, the input member 216, sun gear 246, sun gear 248, planet carrier member 250, and gear members 254, 267, 278, 288 are coaxially disposed, and selectively rotatable, about axis 300. Ring gear member 230, sun gear member 232, planet carrier member 234, and gear members 256, 266, and 290 are coaxially disposed, and selectively rotatable, about axis 302. Ring gear member 238, sun gear member 240, planet carrier member 242, and gear members 276, 280, 286 are coaxially disposed, and selectively rotatable, about axis 304. Gear member 292 and output member 218 are coaxially disposed, and selectively rotatable about, axis 306. The first rotor 262 and gear member 264 are coaxially disposed, and selectively rotatable, about axis 310. The second rotor 272 and gear member 274 are coaxially disposed, and selectively rotatable, about axis 308.

Accordingly, the first rotor 262 is selectively rotatable about a first axis 310, and the second rotor 272 is selectively rotatable about a second axis 308. The first, second, and third planetary members 230, 232, 234 of the first planetary gearset 224 are selectively rotatable about a third axis 302. The first, second, and third planetary members 238, 240, 242 of the second planetary gearset 226 are selectively rotatable about a fourth axis 304. The first, second, and third planetary members 246, 248, 250 of the third planetary gearset 228 are also selectively rotatable about a fifth axis 300.

Figure 6:
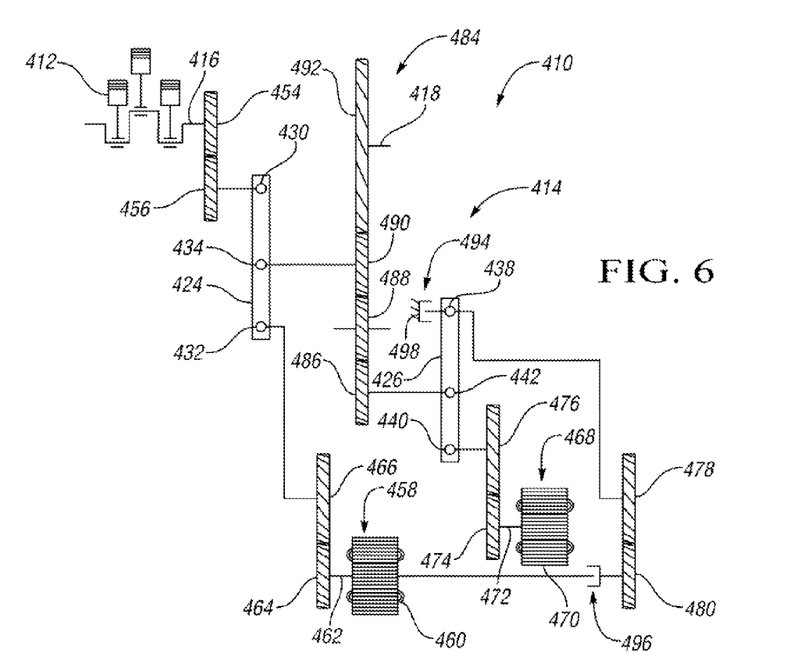
FIG. 6 is a schematic lever diagram depicting a third transmission in accordance with the claimed invention.

Referring to FIG. 6, a vehicle powertrain 410 is schematically depicted. The powertrain includes an engine 412 and a transmission 414. The transmission 414 includes an input member 416 and an output member 418. The input member 416 is operatively connected to the crankshaft of the engine 412 to receive torque therefrom. The output member 418 is operatively connected to the vehicle's drive wheels to transmit torque thereto. The transmission 414 also includes first and second planetary gearsets 424, 426.

Each of the planetary gearsets 424, 426 includes respective first, second, and third planetary members. In the first planetary gearset 424, the first planetary member is a ring gear member 430, the second planetary member is a sun gear member 432, and the third planetary member is a planet carrier member 434. The first planetary gearset includes at least one pinion gear (not shown) that is rotatably connected to the planet carrier member 434, and that is meshingly engaged with both the ring gear member 430 and the sun gear member 432.

In the second planetary gearset 426, the first planetary member is a ring gear member 438, the second planetary member is a sun gear member 440, and the third planetary member is a planet carrier member 442. The second planetary gearset includes at least one pinion gear (not shown) that is rotatably connected to the planet carrier member 442, and that is meshingly engaged with both the ring gear member 438 and the sun gear member 440.

The input member 416 is operatively connected to ring gear member 430 via a plurality of meshing engine transfer gear members 454, 456. More specifically, the input member 416 is operatively connected to a first engine transfer gear member 454 for unitary rotation therewith. Ring gear member 430 is operatively connected to a second engine transfer gear member 456 for unitary rotation therewith. Gear member 454 and gear member 456 are meshingly engaged with one another. Gear members 454, 456 allow for optimizing engine to drivetrain matching. Accordingly, the ring gear member 430 is operatively connected to the input member 416 to receive torque therefrom via the gear members 454, 456.

A first motor/generator 458 includes a stator 460 and a first rotor 462. The sun gear 432 is operatively connected to the first rotor 462 to receive torque therefrom. More specifically, the first rotor 462 is operatively connected to sun gear member 432 via a motor torque transfer mechanism having a plurality of meshing motor torque transfer gear members 464, 466. The rotor 462 is operatively connected to a first motor torque transfer gear member 464 for unitary rotation therewith. Sun gear member 432 is operatively connected to a second motor torque transfer gear member 466 for unitary rotation therewith. Gear member 464 and gear member 466 are meshingly engaged with one another.

A second motor/generator 468 includes a stator 470 and a second rotor 472. The sun gear member 440 is operatively connected to the second rotor 472 to receive torque therefrom. More specifically, the second rotor 472 is operatively connected to sun gear member 440 via a motor torque transfer mechanism having a plurality of meshing motor torque transfer gear members 474, 476. More specifically, the second rotor 472 is operatively connected to a first motor torque transfer gear member 474 for unitary rotation therewith. Sun gear member 440 is operatively connected to a second motor torque transfer gear member 476 for unitary rotation therewith. Gear member 474 and gear member 476 are meshingly engaged with one another.

The first rotor 462 is selectively connectable to ring gear member 438 to transmit torque thereto. More specifically, a gear member 478 is operatively connected to ring gear member 438 for unitary rotation therewith. The gear member 478 is meshingly engaged with another gear member 480. A selectively engageable torque transmitting device 496 is operatively connected to the gear member 480 and the first rotor 462. The torque transmitting device 496 is configured to selectively couple the first rotor 462 and the gear member 480 for unitary rotation.

Planet carrier 434 is operatively connected to the output member 418 to transmit torque thereto via a dual transfer final drive system 484. Planet carrier 442 is also operatively connected to the output member 418 to transmit torque thereto via the dual transfer final drive system 484. The dual transfer final drive system 484 includes a first gear member 486, a second gear member 488, a third gear member 490, and a fourth gear member 492. The first gear member 486 is operatively connected to planet carrier member 442 for unitary rotation therewith. The second gear member 488 is meshingly engaged with the first and third gear members 486, 490. The third gear member 490 is operatively connected to planet carrier member 434 for unitary rotation therewith. The fourth gear member 492 is operatively connected to the output member 18 for unitary rotation therewith and is meshingly engaged with the third gear member 490.

The transmission includes another torque transmitting mechanism, namely, a brake 494, which is configured to selectively couple ring gear member 438 to a stationary member, such as the transmission housing 498 to prevent the rotation of the ring gear member 438.

Figure 7:
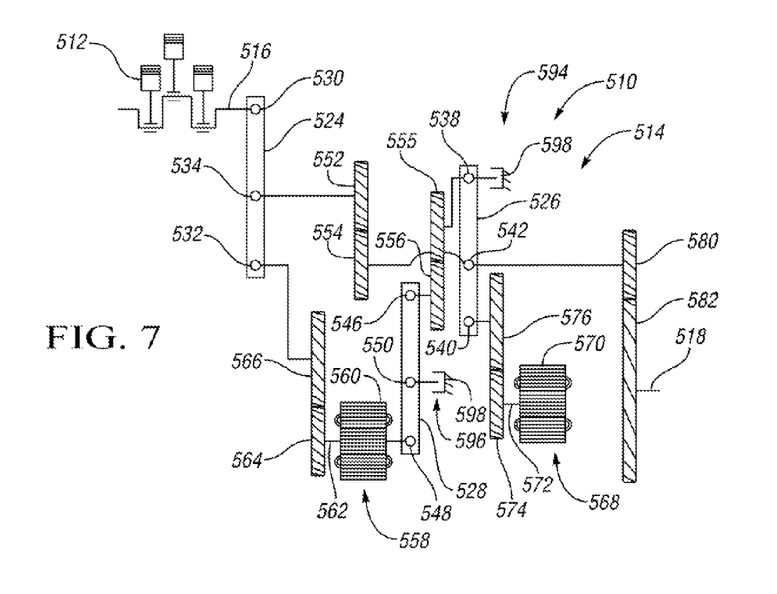
FIG. 7 is a schematic lever diagram depicting a fourth transmission in accordance with the claimed invention.

Referring to FIG. 7, a vehicle powertrain 510 is schematically depicted. The powertrain includes an engine 512 and a transmission 514. The transmission 514 includes an input member 516 and an output member 518. The input member 516 is operatively connected to the crankshaft of the engine 512 to receive torque therefrom. The output member 518 is operatively connected to the vehicle's drive wheels to transmit torque thereto. The transmission 514 also includes first, second and third planetary gearsets 524, 526, 528.

Each of the planetary gearsets 524, 526, 528 includes respective first, second, and third planetary members. In the first planetary gearset 524, the first planetary member is a ring gear member 530, the second planetary member is a sun gear member 532, and the third planetary member is a planet carrier member 534. The first planetary gearset includes at least one pinion gear (not shown) that is rotatably connected to the planet carrier member 534, and that is meshingly engaged with both the ring gear member 530 and the sun gear member 532.

In the second planetary gearset 526, the first planetary member is a ring gear member 538, the second planetary member is a sun gear member 540, and the third planetary member is a planet carrier member 542. The second planetary gearset includes at least one pinion gear (not shown) that is rotatably connected to the planet carrier member 542, and that is meshingly engaged with both the ring gear member 538 and the sun gear member 540.

In the third planetary gearset 528, the first planetary member is a ring gear member 546, the second planetary member is a sun gear member 548, and the third planetary member is a planet carrier member 550. The second planetary gearset includes at least one pinion gear (not shown) that is rotatably connected to the planet carrier member 550, and that is meshingly engaged with both the ring gear member 546 and the sun gear member 548.

The input member 516 is operatively connected to ring gear member 530 for unitary rotation therewith. Accordingly, the ring gear member 530 is operatively connected to the input member 516 to receive torque therefrom. The planet carrier member 534 is operatively connected to a gear member 552 for unitary rotation therewith. Planet carrier member 542 is operatively connected to a gear member 554 for unitary rotation therewith. Gear member 552 and gear member 554 are meshingly engaged with one another.

Ring gear member 538 is operatively connected to gear member 555 for unitary rotation therewith. Ring gear member 546 is operatively connected to gear member 556 for unitary rotation therewith. Gear member 555 and gear member 556 are meshingly engaged with one another.

A first motor/generator 558 includes a stator 560 and a first rotor 562. The sun gear 532 is operatively connected to the first rotor 562 to receive torque therefrom. More specifically, the first rotor 562 is operatively connected to sun gear member 532 via a motor torque transfer mechanism having a plurality of meshing motor torque transfer gear members 564, 566. The rotor 562 is operatively connected to a first motor torque transfer gear member 564 for unitary rotation therewith. Sun gear member 532 is operatively connected to a second motor torque transfer gear member 566 for unitary rotation therewith. Gear member 564 and gear member 566 are meshingly engaged with one another. Sun gear member 548 is operatively connected to gear member of the first rotor 562 for unitary rotation therewith. Accordingly, sun gear member 548 is operatively connected to the first rotor 562 to receive torque therefrom.

A second motor/generator 568 includes a stator 570 and a second rotor 572. The sun gear member 540 is operatively connected to the second rotor 572 to receive torque therefrom. More specifically, the second rotor 572 is operatively connected to sun gear member 540 via a motor torque transfer mechanism having a plurality of meshing motor torque transfer gear members 574, 576. More specifically, the second rotor 572 is operatively connected to a first motor torque transfer gear member 574 for unitary rotation therewith. Sun gear member 540 is operatively connected to a second motor torque transfer gear member 576 for unitary rotation therewith. Gear member 574 and gear member 576 are meshingly engaged with one another.

Planet carrier member 542 is operatively connected to gear member 580 for unitary rotation therewith. The output member 518 is operatively connected to gear member 582 for unitary rotation therewith. Gear member 580 and gear member 582 are meshingly engaged with one another.

The transmission includes a first torque transmitting mechanism, namely, a first brake 594, which is configured to selectively couple ring gear member 538 to a stationary member, such as the transmission housing 598 to prevent the rotation of the ring gear member 538. The transmission includes a second torque transmitting mechanism, namely, a second brake 596, which is configured to selectively couple planet carrier member 550 to a stationary member, such as the transmission housing 598 to prevent the rotation of the planet carrier member 550.

Figure 8:
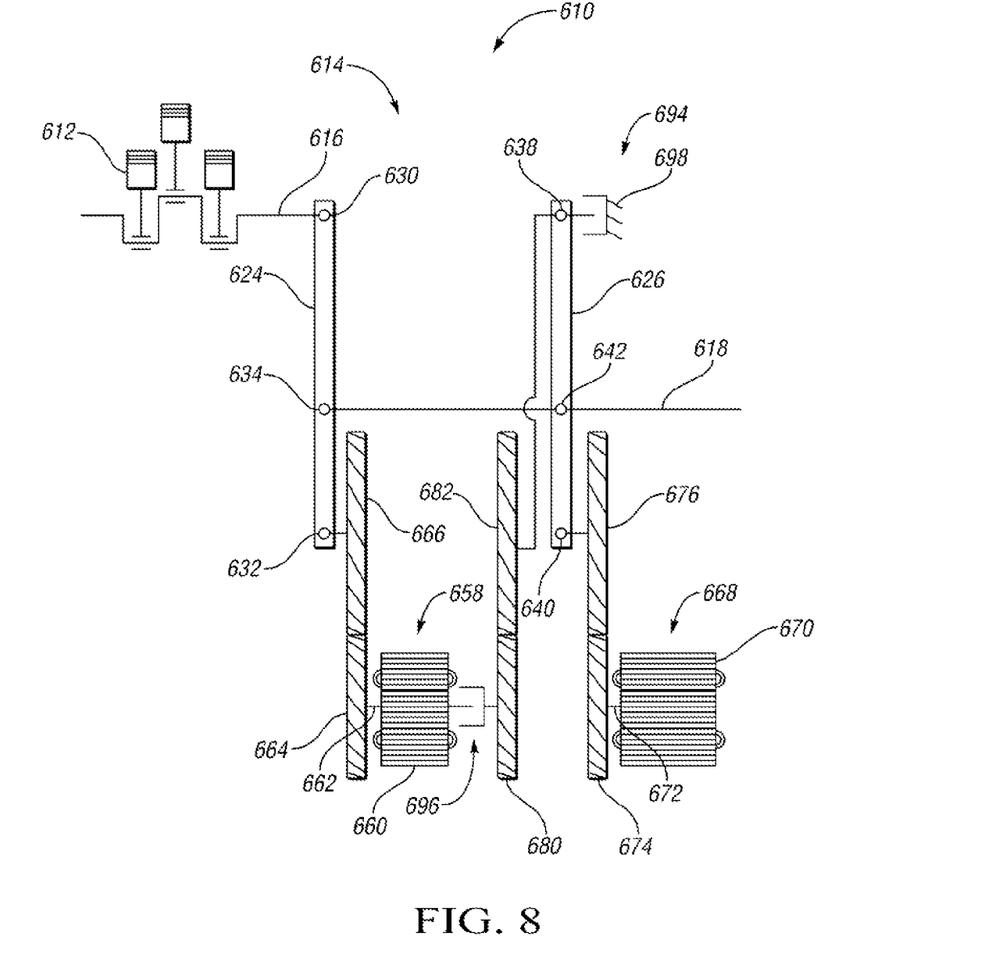
FIG. 8 is a schematic lever diagram depicting a fifth transmission in accordance with the claimed invention.

Referring to FIG. 8, a vehicle powertrain 610 is schematically depicted. The powertrain includes an engine 612 and a transmission 614. The transmission 614 includes an input member 616 and an output member 618. The input member 616 is operatively connected to the crankshaft of the engine 612 to receive torque therefrom. The output member 618 is operatively connected to the vehicle's drive wheels to transmit torque thereto. The transmission 614 also includes first and second planetary gearsets 624, 626.

Each of the planetary gearsets 624, 626 includes respective first, second, and third planetary members. In the first planetary gearset 624, the first planetary member is a ring gear member 630, the second planetary member is a sun gear member 632, and the third planetary member is a planet carrier member 634. The first planetary gearset 624 includes at least one pinion gear (not shown) that is rotatably connected to the planet carrier member 634, and that is meshingly engaged with both the ring gear member 630 and the sun gear member 632.

In the second planetary gearset 626, the first planetary member is a ring gear member 638, the second planetary member is a sun gear member 640, and the third planetary member is a planet carrier member 642. The second planetary gearset includes at least one pinion gear (not shown) that is rotatably connected to the planet carrier member 642, and that is meshingly engaged with both the ring gear member 638 and the sun gear member 640. The input member 616 is operatively connected to ring gear member 630 for unitary rotation therewith. Accordingly, the ring gear member 630 is operatively connected to the input member 616 to receive torque therefrom.

A first motor/generator 658 includes a stator 660 and a first rotor 662. The sun gear 632 is operatively connected to the first rotor 662 to receive torque therefrom. More specifically, the first rotor 662 is operatively connected to sun gear member 632 via a motor torque transfer mechanism having a plurality of meshing motor torque transfer gear members 664, 666. The rotor 662 is operatively connected to a first motor torque transfer gear member 664 for unitary rotation therewith. Sun gear member 632 is operatively connected to a second motor torque transfer gear member 666 for unitary rotation therewith. Gear member 664 and gear member 666 are meshingly engaged with one another.

A second motor/generator 668 includes a stator 670 and a second rotor 672. The sun gear member 640 is operatively connected to the second rotor 672 to receive torque therefrom. More specifically, the second rotor 672 is operatively connected to sun gear member 640 via a motor torque transfer mechanism having a plurality of meshing motor torque transfer gear members 674, 676. More specifically, the second rotor 672 is operatively connected to a first motor torque transfer gear member 674 for unitary rotation therewith. Sun gear member 640 is operatively connected to a second motor torque transfer gear member 676 for unitary rotation therewith. Gear member 674 and gear member 676 are meshingly engaged with one another.

The first rotor 662 is selectively connectable to ring gear member 638 to transmit torque thereto. More specifically, a gear member 682 is operatively connected to ring gear member 638 for unitary rotation therewith. The gear member 682 is meshingly engaged with another gear member 680. A selectively engageable torque transmitting device 696 is operatively connected to the gear member 680 and the first rotor 662. The torque transmitting device 696 is configured to selectively couple the first rotor 662 and the gear member 680 for unitary rotation.

The transmission includes another torque transmitting mechanism, namely, a brake 694, which is configured to selectively couple ring gear member 638 to a stationary member, such as the transmission housing 698 to prevent the rotation of the ring gear member 638. Planet carrier 634 and planet carrier 642 are operatively connected to the output member 618 for unitary rotation therewith.

Figure 9:
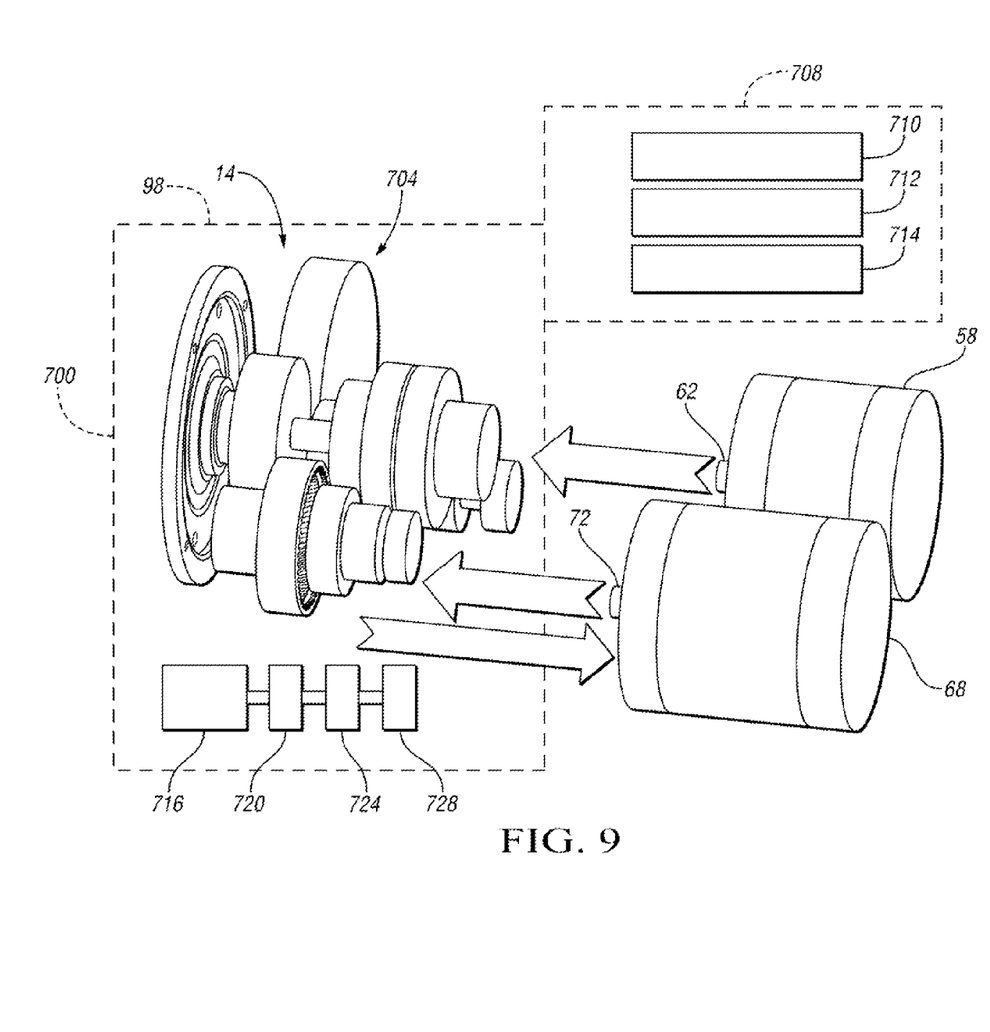
FIG. 9 is a schematic, perspective view of a modular transmission assembly.

The transmissions 14, 214, 414, 514, 614 optimize motor/generator and engine efficiency by employing transfer gearing to transmit torque from the engine crankshaft or the motor/generator rotors to members of the planetary gearsets. The dual transfer final drive systems 84, 284, 484 allow independent power ratio adjustment for the respective first motors and the respective second motors while enabling a geometrically flat transmission that places motors optimally relative to vehicle packaging requirements and creates contiguous space to incorporate commonly located, cooled, encased, etc., electronics. Referring to FIG. 9, wherein like reference numbers refer to like components from FIGS. 1-3, modular assembly allows for a common gear box 700, which includes the housing 98 containing the geartrain 704, i.e., the planetary gearsets and transfer gearing of the transmission 14. The gear box 700 provides an interface at which the motor/generators 58, 68 are connectable so that their rotors 62, 72 are connected to the motor torque transfer gear members. The motor/generators 58, 68 in the embodiment depicted are selectable, self contained modules that are tailored to the vehicle application.

Thus, the transmission 14 enables lower assembly cost by allowing external build of internal gear systems (i.e., geartrain 704) and modularizing the motor/generators 58, 68. Motor/generators 58, 68 are built and assembled within a separate self contained module that bolts to the gear box 700. The transmission 14 also enables cost reduction by using a common gearbox 700 with selectable alternate motor/generator modules that are specifically tailored to the needs of a particular vehicle. Accordingly, a common gear box 700 may be employed in a plurality of different vehicle configurations; different motor modules (having, e.g., different sizes, torque output, etc.) may be attached to the gear box 700 to accommodate differences in the performance requirements of the different vehicle configurations.

Vehicle packaging limitations sometimes result in multiple locations for electronics, which then require redundant support systems (housings, harnesses, mounts, clamps, pumps, coolant, etc.). The packaging of the transmission 14, and the motor/generators 58, 68 being "off axis," provides additional contiguous space for co-locating/packaging/integrating hybrid electronics in a single module 708. In the embodiment depicted, the electronics module 708 includes the traction power inverter module (TPIM) 710, the accessory power module (APM) 712, and other electronic systems 714. Co-locating and integrating the electronics in a single module 708 eliminates extra housings, harnesses, mounts, pumps, coolant lines, etc. that may be required when the electronics are disposed in separate locations throughout the vehicle.

An electric motor 716 is operatively connected to a lube/cooling oil pump 720, a water pump 724, and air conditioning compressor 728, which are all co-located within the gearbox 700. The motor 716, which turns the pumps 720, 724 and the compressor 728, is cooled by the oil system within the transmission 14 thereby leveraging synergies (oil pump peak torque with cold oil, water, and A/C peak torque with hot oil).

The transmissions 14, 214, 414, 514, 614 use low energy loss clutches (i.e., torque transmitting devices) to eliminate high pressure hydraulics (for clutch actuation). Referring to FIGS. 1 and 5, transmissions 14, 214 include brakes 94, 96, 294, 296 rather than rotating clutches, thereby reducing spin losses and mechanical/hydraulic complexity. High pressure oil seals and clutch oil routing may also be eliminated by enabling alternate clutch actuation methods (electric, electro magnetic, or combinations) to minimize parasitic energy loss. Traditional clutching systems and their associated hydraulic actuation are still possible if required.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member; an output member; a stationary member;
   a first motor/generator having a first rotor that is selectively rotatable about a first axis;
   a second motor/generator having a second rotor that is selectively rotatable about a second axis;
   a first planetary gearset and a second planetary gearset each having a respective first planetary member, a respective second planetary member, and a respective third planetary member;
   said first planetary member of the first planetary gearset being operatively connected to the input member to receive torque therefrom;
   said second planetary member of the first planetary gearset being operatively connected to the first rotor to receive torque therefrom;
   said third planetary member of the first planetary gearset being operatively connected to the output member to transmit torque thereto;
   said second planetary member of the second planetary gearset being operatively connected to the second rotor to receive torque therefrom;
   said third planetary member of the second planetary gearset being operatively connected to the output member to transmit torque thereto;
   a first torque transmitting device that is selectively engageable to couple the first planetary member of the second planetary gearset to the stationary member;
   a third planetary gearset having another first planetary member, another second planetary member, and another third planetary member;
   said second planetary member of the third planetary gearset being operatively connected to the first rotor to receive torque therefrom;
   said third planetary member of the third planetary gearset being operatively connected to the first planetary member of the second planetary gearset to transmit torque thereto;
   a second torque transmitting device that is selectively engageable to couple the first planetary member of the third planetary gearset to the stationary member;
   an axis transfer mechanism having a first axis transfer gear member, a second axis transfer gear member, and a third axis transfer gear member;
   wherein the first axis transfer gear member is operatively connected to the third planetary member of the third planetary gearset for unitary rotation therewith;
   wherein the second axis transfer gear member is meshingly engaged with the first and second axis transfer gear members; and wherein the third axis transfer gear member is operatively connected to the first planetary member of the second planetary gearset for unitary rotation therewith.

2. The transmission of claim 1, wherein the first, second, and third planetary members of the first planetary gearset are selectively rotatable about a third axis; and
wherein the first, second, and third planetary members of the second planetary gearset are selectively rotatable about a fourth axis.

3. The transmission of claim 2, further comprising a final drive system having a first gear member, a second gear member, a third gear member, and a fourth gear member;
wherein the first gear member is operatively connected to the third planetary member of the second planetary gearset for unitary rotation therewith;
wherein the second gear member is meshingly engaged with the first and third gear members;
wherein the third gear member is operatively connected to the third planetary member of the first planetary gearset for unitary rotation therewith; and
wherein the fourth gear member is operatively connected to the output member for unitary rotation therewith and is meshingly engaged with the third gear member.

4. The transmission of claim 2, wherein the first, second, and third planetary members of the third planetary gearset are selectively rotatable about the third axis.

5. The transmission of claim 2, wherein the first, second, and third planetary members of the third planetary gearset are selectively rotatable about a fifth axis.

6. The transmission of claim 5, further comprising a motor torque transfer mechanism including first, second, and third motor torque transfer gear members;
wherein the first motor torque transfer gear member is operatively connected to the first rotor for unitary rotation therewith;
wherein the second motor torque transfer gear member is operatively connected to the second planetary member of the first planetary gearset for unitary rotation therewith and is meshingly engaged with the first motor torque transfer gear member; and
wherein the third motor torque transfer gear member is operatively connected to the second planetary member of the third planetary gearset for unitary rotation therewith and is meshingly engaged with the second motor torque transfer gear member.

7. A transmission comprising:
an output member;
a stationary member;
a first planetary gearset and a second planetary gearset each having a respective first planetary member, a respective second planetary member, and a respective third planetary member;
a final drive system having a first gear member, a second gear member, a third gear member, and a fourth gear member;
wherein the first gear member is operatively connected to the third planetary member of the second planetary gearset for unitary rotation therewith;
wherein the second gear member is meshingly engaged with the first and third gear members;
wherein the third gear member is operatively connected to the third planetary member of the first planetary gearset for unitary rotation therewith;
wherein the fourth gear member is operatively connected to the output member for unitary rotation therewith and is meshingly engaged with the third gear member;
wherein each of the first, second, third, and fourth gear members is selectively rotatable about a respective axis of rotation;
wherein each of the respective axes of rotation is different from the other respective axes of rotation;
a first motor/generator having a first rotor operatively connected to the second planetary member of the first planetary gearset to transmit torque thereto;
a second motor/generator having a second rotor operatively connected to the second planetary member of the second planetary gearset to transmit torque thereto;
a third planetary gearset having another first planetary member, another second planetary member, and another third planetary member;
said second planetary member of the third planetary gearset being operatively connected to the first rotor to receive torque therefrom;
said third planetary member of the third planetary gearset being operatively connected to the first planetary member of the second planetary gearset to transmit torque thereto; and
a second torque transmitting device that is selectively engageable to couple the first planetary member of the third planetary gearset to the stationary member.

8. The transmission of claim 7, wherein the first rotor is selectively rotatable about a first axis;
wherein the second rotor is selectively rotatable about a second axis.

9. The transmission of claim 8, further comprising an input member that is operatively connected to the first planetary member of the first planetary gearset to transmit torque thereto; and
a selectively engageable torque transmitting device that is configured to selectively couple the first planetary member of the second planetary gearset to the stationary member.

10. The transmission of claim 9, wherein the first, second, and third planetary members of the first planetary gearset are selectively rotatable about a third axis; and
wherein the first, second, and third planetary members of the second planetary gearset are selectively rotatable about a fourth axis.

11. The transmission of claim 10, wherein the first, second, and third planetary members of the third planetary gearset are selectively rotatable about the third axis.

12. The transmission of claim 11, further comprising an axis transfer mechanism having a first axis transfer gear member, a second axis transfer gear member, and a third axis transfer gear member;
wherein the first axis transfer gear member is operatively connected to the third planetary member of the third planetary gearset for unitary rotation therewith;
wherein the second axis transfer gear member is meshingly engaged with the first and second axis transfer gear members; and
wherein the third axis transfer gear member is operatively connected to the first planetary member of the second planetary gearset for unitary rotation therewith.

13. The transmission of claim 7, wherein the first, second, and third planetary members of the third planetary gearset are selectively rotatable about a fourth axis.

14. The transmission of claim 13, further comprising a motor torque transfer mechanism including first, second, and third motor torque transfer gear members;
wherein the first motor torque transfer gear member is operatively connected to the first rotor for unitary rotation therewith;

wherein the second motor torque transfer gear member is operatively connected to the second planetary member of the first planetary gearset for unitary rotation therewith and is meshingly engaged with the first motor torque transfer gear member; and wherein the third motor torque transfer gear member is operatively connected to the second planetary member of the third planetary gearset for unitary rotation therewith and is meshingly engaged with the second motor torque transfer gear member.

\* \* \* \* \*